W. E. KELLEY.
Cotton-Seed Drill.

No. 204,671. Patented June 11, 1878.

Witnesses:
Sophia E. Kelley.
Eros Lincoln.

Inventor:
William E. Kelley.

UNITED STATES PATENT OFFICE.

WILLIAM E. KELLEY, OF COLDWATER, MICHIGAN.

IMPROVEMENT IN COTTON-SEED DRILLS.

Specification forming part of Letters Patent No. 204,671, dated June 11, 1878; application filed January 5, 1878.

*To all whom it may concern:*

Figure 1:
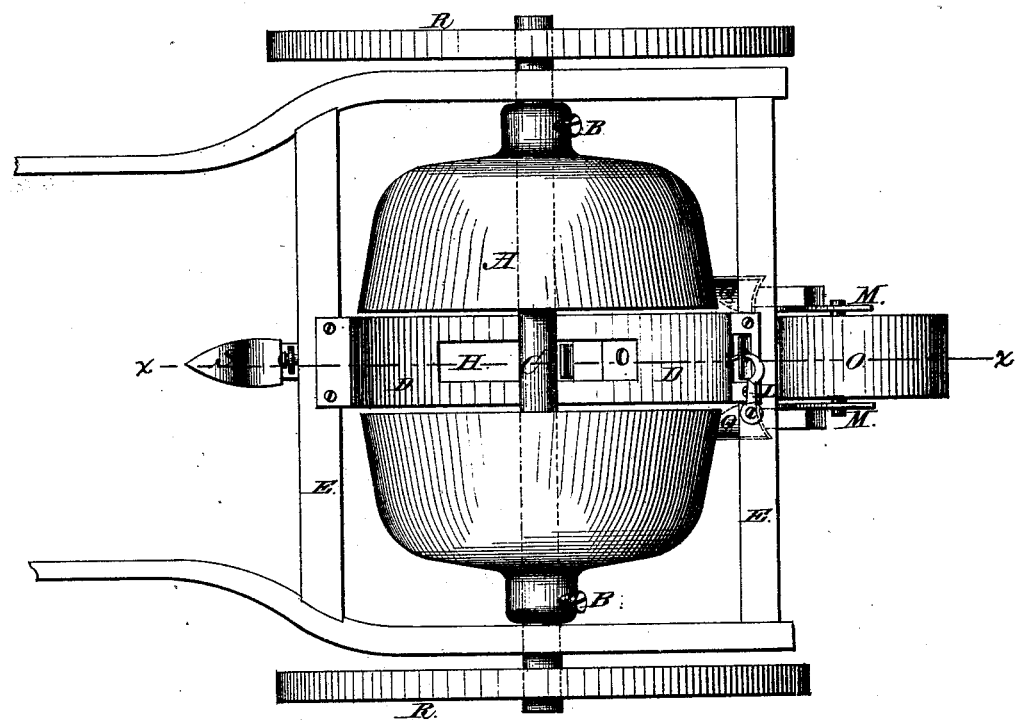
Figure 2:
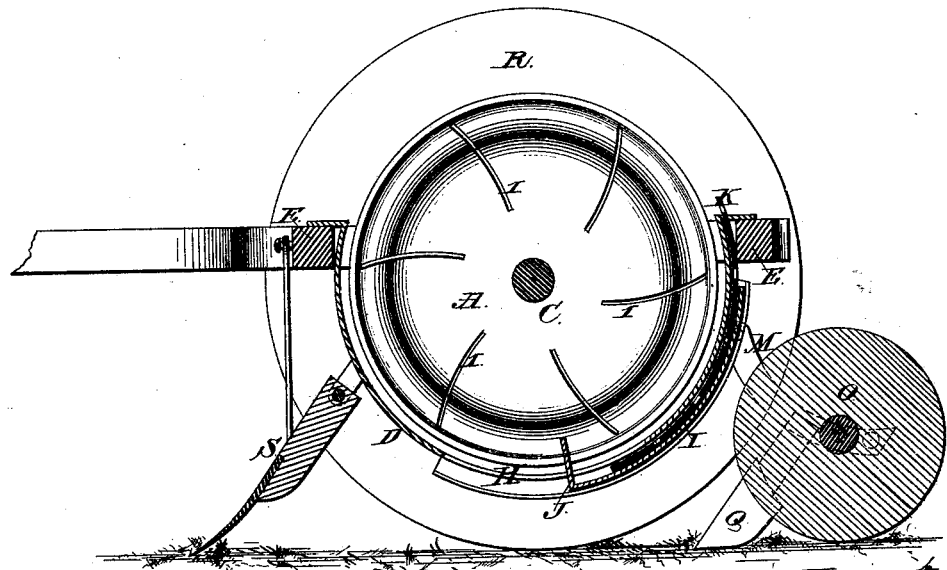

Be it known that I, WILLIAM E. KELLEY, of Coldwater, in the county of Branch and State of Michigan, have invented a new and useful Improvement for Planting Cotton, of which the following is a specification:

Figure 1 is a top-plan view. Fig. 2 is a sectional view of Fig. 1 on the line $x\ x$.

The object of my invention is to drop and cover cotton-seed in drills, and is described as follows, to wit: Two elevated revolving seed-boxes or tubs, A A, made flaring or larger at the open end, with curved elevators on the inside, as shown in Fig. 2 of the accompanying drawing, and marked 1 1 1, for the purpose of raising and bringing the seed forward to the aperture in the receiver, and placed on the horizontal axle or shaft C, which passes through the center of the bottom, with the open ends facing each other, and revolving with the axle C, causing the seed to fall toward the center.

The seed-boxes A A are so arranged on the shaft C that they may be moved to any distance apart, and are secured by means of the set-screws or pins B B, and easily moved to allow the proper or required amount of seed to pass on to the receiver D.

The receiver D is made on the same circle as the seed boxes or tubs A A, and passes a little more than half-way around them underneath, with the ends resting on the frame E, with a slight depression in the center, and an aperture at H, and made to fit so closely to the seed-boxes A A as to allow the seed to escape only through the aperture H.

In the aperture H is inserted the stop or regulator I, with a tongue, J, which passes up between the seed boxes or tubs into the seed, and the tongue J, being stationary, while the boxes A A revolve, forces the seed out at the aperture H.

The stop or regulator I is made to run in the slot on the under side of the receiver D, and passes up to the rear to the point K, when it is raised or lowered, and secured at the desired point by a spring or catch, L, and the aperture at the bottom thereby made to any required size.

In front of the aperture H of the receiver D is placed the opener or marker S. In the rear, and directly after the aperture H of the receiver D, are attached the coverer and roller-frame M. In the frame M is journaled the roller O. On each side of the frame M are attached the coverers Q Q, with shovels so arranged as to throw the earth toward each other and on the seed in front of the roller O.

The roller O serves to press the earth on the seed and to gage the depth of the coverers Q Q, thereby securing uniformity of cover.

On the shaft C, and fastened thereto, are the drive-wheels R R, whose diameter is about twice that of the seed boxes or tubs A A, thereby securing the elevation of the latter above the ground to such a distance as to enable the operator to see that the flow of seed is always free.

What I claim is—

1. The revolving elevated seed boxes or tubs, with the curved elevators 1 1 1 on the inside, arranged on the shaft C so as to throw the seed to the center, as herein described.

2. In combination, the revolving seed boxes or tubs, with the curved elevators inside, the receiver D, with aperture H, and stop I, with tongue J, the opener or marker S, and the coverers and rollers, all arranged to operate as described, for the purpose herein set forth.

WILLIAM E. KELLEY.

Witnesses:
SOPHIA E. KELLEY,
PERIES LINCOLN.